United States Patent
Lee et al.

(10) Patent No.: US 9,285,125 B2
(45) Date of Patent: Mar. 15, 2016

(54) PREFABRICATED HEAT-INSULATION PANEL WITH TWO HOT WATER FLOW PATHS

(76) Inventors: Hi Gon Lee, Seoul (KR); Ha Rim Kim, Chungcheongbuk-do (KR)

(*) Notice: Subject to any disclaimer, the term of this patent is extended or adjusted under 35 U.S.C. 154(b) by 1268 days.

(21) Appl. No.: 13/120,426

(22) PCT Filed: Sep. 21, 2009

(86) PCT No.: PCT/KR2009/005367
§ 371 (c)(1),
(2), (4) Date: Mar. 22, 2011

(87) PCT Pub. No.: WO2010/033001
PCT Pub. Date: Mar. 25, 2010

(65) Prior Publication Data
US 2011/0168794 A1    Jul. 14, 2011

(30) Foreign Application Priority Data
Sep. 22, 2008 (KR) ................ 10-2008-0092609

(51) Int. Cl.
| | | |
|---|---|---|
| *F24D 3/00* | (2006.01) | |
| *F24D 3/12* | (2006.01) | |
| *F24D 3/14* | (2006.01) | |
| *F16L 11/04* | (2006.01) | |
| *F28D 1/03* | (2006.01) | |
| *F28F 21/06* | (2006.01) | |

(52) U.S. Cl.
CPC ............ *F24D 3/125* (2013.01); *F24D 3/142* (2013.01); *F16L 11/04* (2013.01); *F28D 1/035* (2013.01); *F28F 21/066* (2013.01); *F28F 2210/10* (2013.01)

(58) Field of Classification Search
USPC ............................................ 237/69
See application file for complete search history.

(56) References Cited

U.S. PATENT DOCUMENTS

| | | | | |
|---|---|---|---|---|
| 1,744,517 A | * | 1/1930 | Barker | F24D 3/147 237/69 |
| 2,888,001 A | * | 5/1959 | Morrish | F02M 1/100 123/184.33 |
| 3,437,551 A | * | 4/1969 | Marshack | 428/308.4 |

(Continued)

FOREIGN PATENT DOCUMENTS

| | | |
|---|---|---|
| JP | 09-303803 | 11/1997 |
| JP | 2001-96622 A * | 4/2001 |

(Continued)

OTHER PUBLICATIONS

Kobayashi, JP09-303803A English machine translation, Nov. 28, 1997.*

(Continued)

*Primary Examiner* — Alissa Tompkins
*Assistant Examiner* — Phillip E Decker
(74) *Attorney, Agent, or Firm* — Dilworth & Barrese, LLP.

(57) ABSTRACT

A prefabricated heat-insulation panel has two hot water flow paths installed separately inside a panel, with primary and secondary connection parts provided in the panel and connected to a boiler or allowing hot water to circulate to adjacent panels. A polybutene layer with rosin as an activator is formed on the inner surface of the hot water supply pipe made of thermoplastic elastomer, and reduces the diameter and the length of the hot water supply pipes installed in the panel and the panel thickness and minimizes the boiler load.

17 Claims, 9 Drawing Sheets

(56) References Cited

U.S. PATENT DOCUMENTS

| | | | | |
|---|---|---|---|---|
| 3,568,924 A | * | 3/1971 | Chenault | 237/69 |
| 4,073,998 A | * | 2/1978 | O'Connor | 442/55 |
| 4,212,348 A | * | 7/1980 | Kobayashi | F24D 3/14 237/69 |
| 4,287,245 A | * | 9/1981 | Kikuchi | 428/34.2 |
| 4,646,815 A | * | 3/1987 | Iwata | F28D 1/0308 237/69 |
| 4,817,707 A | * | 4/1989 | Aoyama | F24D 3/16 237/69 |
| 4,868,967 A | * | 9/1989 | Holt et al. | 29/450 |
| 5,080,166 A | * | 1/1992 | Haugeneder | 237/69 |
| 5,097,893 A | * | 3/1992 | Trimble | 237/69 |
| 5,871,151 A | * | 2/1999 | Fiedrich | F24D 5/10 237/69 |
| 6,152,377 A | * | 11/2000 | Fiedrich | F24D 3/14 237/69 |
| 6,283,382 B1 | * | 9/2001 | Fitzemeyer | F24D 3/141 237/69 |
| 6,776,222 B2 | * | 8/2004 | Seki et al. | 237/69 |
| 6,883,590 B1 | * | 4/2005 | Messana | 237/69 |
| 7,228,886 B2 | * | 6/2007 | Seki et al. | 237/69 |
| 7,404,432 B2 | * | 7/2008 | Kang et al. | 165/56 |
| 7,658,005 B2 | * | 2/2010 | Sulzer | F24D 3/125 237/69 |
| 8,192,813 B2 | * | 6/2012 | Runyan et al. | 428/35.7 |
| 2003/0060747 A1 | * | 3/2003 | Fries | A61L 2/0011 604/6.08 |
| 2003/0134037 A1 | * | 7/2003 | Wang et al. | 427/230 |
| 2003/0218075 A1 | * | 11/2003 | Muir | F24D 3/148 237/69 |
| 2004/0140042 A1 | * | 7/2004 | Teratani et al. | 156/110.1 |
| 2004/0179781 A1 | * | 9/2004 | Melikechi | G02B 6/12007 385/39 |
| 2007/0196681 A1 | * | 8/2007 | Biggs et al. | 428/550 |
| 2008/0255310 A1 | * | 10/2008 | Tsou et al. | 525/178 |
| 2009/0238811 A1 | * | 9/2009 | McDaniel et al. | 424/94.2 |
| 2010/0233400 A1 | * | 9/2010 | Sano | 428/36.4 |

FOREIGN PATENT DOCUMENTS

| | | |
|---|---|---|
| JP | 2003-064860 | 3/2003 |
| KR | 20 1990 0004526 | 5/1990 |

OTHER PUBLICATIONS

International Search Report for PCT/KR2009/005367 Mailed on May 27, 2010.

\* cited by examiner

PREFABRICATED HEAT-INSULATION PANEL WITH TWO HOT WATER FLOW PATHS

RELATED APPLICATIONS

This application is a 371 application of International Application No. PCT/KR 2009/005367, filed Sep. 21, 2009, which in turn claims priority from Korean Patent Application No. 10-2008-0092609, filed Sep. 22, 2008, each of which is incorporated herein by reference in its entirety.

TECHNICAL FIELD

The present invention relates to a prefabricated heat-insulation panel with two hot water flow paths formed by arranging two hot water flow paths in the interior, and in particular to a prefabricated heat-insulation panel with two hot water flow paths in which at least two hot water supply pipes are integrally arranged in a zigzag shape in the interior of a panel, and all the hot water supply pipes operate like the pipes which supply and retrieve hot water, which results in a superior heating efficiency and heat efficiency, and the hot water supply pipes are connected to hot water supply pipes of another panel, which leads to a superior construction performance.

BACKGROUND ART

An Ondol heating method is a typical Korean traditional floor heating method, which is closely related to Korean life styles and has widely been used for a long period from the past to the modern society.

The principle of the Ondol heating method is basically based on heat conduction. Heat is supplied to the Ondol stones installed beneath the floor, and the Ondol stones are heated and emit heat for thereby heating the floor.

The Ondol heating method has been improved. For one example, an improved Ondol heating method is directed to hot water pipes are installed beneath the floor, and the hot water heated by a boiler is forced to circulate through the hot water pipes for thereby heating the floor.

The improved type Ondol heating method uses a cement mortar. The heating construction using cement mortar needs a long time when curing cement which might be an obstacle interfering with another construction process, and the construction might be difficult in winter.

In order to overcome the above-described problems, there is a method which finishes the Ondol heating method by using a dry type Ondol plate such as floor plate, stone plate, plastic plate, panel, etc. is being developed. The above method will be described with reference to the accompanying drawings.

Figure 1:
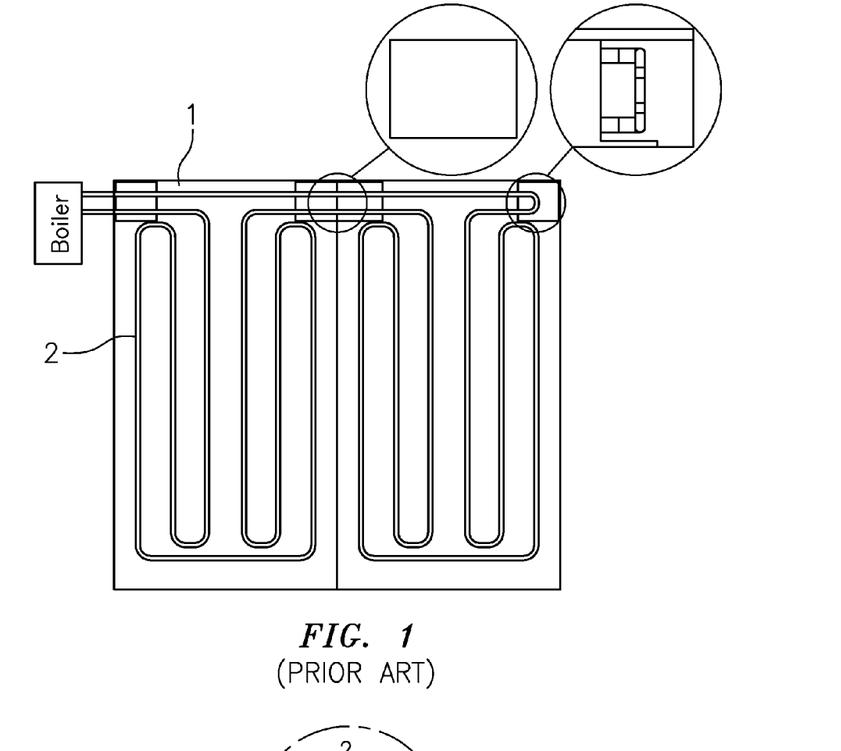
FIG. 1 is a plane view illustrating a conventional heat-insulation panel.
Figure 2:
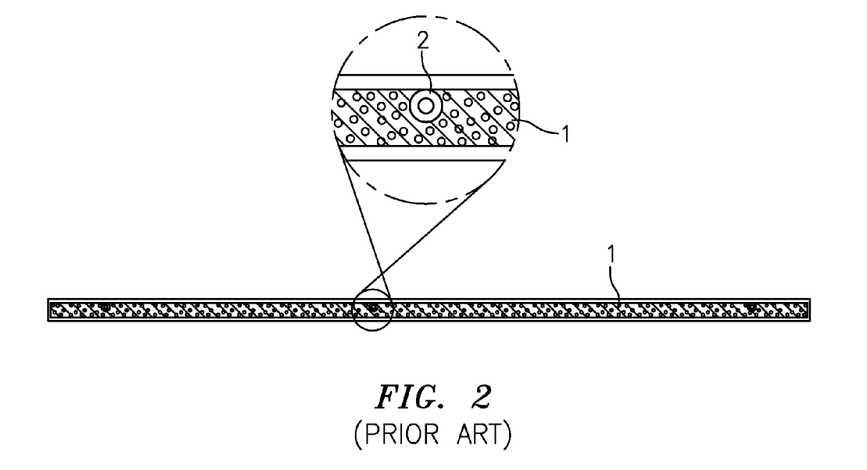
FIG. 2 is a cross sectional view illustrating a conventional heat-insulation panel.

FIG. 1 is a plane view illustrating a conventional heat-insulation panel, and FIG. 2 is a cross sectional view illustrating a conventional heat-insulation panel. As shown therein, the conventional heat-insulation panel 1 is constituted in such a manner that a hot water supply pipe 2 is integrally arranged and fixed in an inner side of the same.

The hot water supply pipe 2 is accommodated in the interior of the panel 1 with one side being curved for the use of hot water supply, with the other side being arranged in series for the use of retrieval of hot water.

The conventional heat-insulation panel 1 is arranged on the floor in multiple numbers, and the hot water supply pipes 2 are connected with one another for thereby finishing work.

As described above, the conventional heat-insulation panel has a disadvantage that the pipes are constructed at limited intervals due to a material property of a hot water supply pipe and a single arrangement, and there is a limit in the transformation of pipes, and the connection pipes of the supply pipes or the retrieval pipes distributed to multiple heating places should be separately provided. For example, in case of an excel pipe used as a hot water supply pipe accommodated in the interior of the panel, its one side is curved for the supply of hot water, and the other side is arranged in series for the retrieval. When the hot water pipes are arranged in one line, there is a problem in reducing the intervals of the pipes due to the bending limit of the excel pipe, and it is hard to make the pipes in various shapes. So, the heat efficiency and heating efficiency are low.

In case of the excel pipe which is generally used, since the outer diameter of the same is large, a thick panel used for accommodating and fixing the excel pipe is needed. In this case, the work for connecting the excel pipes is hard, which leads to increasing the work and time needed for the construction while worsening construction performance.

DISCLOSURE OF INVENTION

Accordingly, it is an object of the present invention to overcome the problems encountered in the conventional art by providing a prefabricated heat-insulation panel with two hot water flow paths in which at least two hot water pipes are provided in a panel for the supply and retrieval of hot water for thereby enhancing a heating efficiency and a heat efficiency. The compactness of a panel is achieved by reducing the diameter of a hot water supply pipe and the length of the same while improving a construction performance.

To achieve the above object, there is provided a prefabricated heat-insulation panel with two hot water flow paths which comprises a panel, first and second hot water supply pipes which are provided in one pair at the inner side of the panel for thereby providing a flow path of hot water, and first and second connection parts which allow the first and second hot water supply pipes to be connected to the first and second hot water supply pipes installed in a boiler and another panel for supplying and circulating hot water.

ADVANTAGEOUS EFFECTS

The heat-insulation panel formed of two hot water flow paths according to the present invention has the following advantages.

First, at least two hot water supply pipes providing different hot water flow paths are used in the panel for heating, so heating efficiency can be enhance.

Second, since two hot water supply paths are formed in the panel in one pair, the hot water flowing and circulating along each flow path provides heat to each other, the cooling phenomenon can be minimized, which results in maximizing heat efficiency while reducing the consumption of electric power.

Third, a polybutene layer with rosin as an activator is formed on the inner surface of the hot water supply pipe made of thermoplastic elastomer, so it is possible to easily arrange a double arrangement structure of a hot water supply pipe having excellent heat resistance performance and weather resistance performance, and the pipe intervals and the configuration of the hot water supply pipes can be freely determined.

Fourth, the diameter and length of the hot water supply pipe installed at the panel can be reduced for thereby reducing the thickness of the panel and minimizing the load applied to the boiler. The flow speed of the hot water circulating via the hot water supply pipe increases, which leads to faster and uniform heating.

Fifth, the connection work of the hot water supply pipes is easy in the course of the arrangement of panels, and the construction performance is excellent.

BRIEF DESCRIPTION OF THE DRAWINGS

The present invention will become better understood with reference to the accompanying drawings which are given only by way of illustration and thus are not limitative of the present invention, wherein.

DESCRIPTIONS OF REFERENCE NUMERALS OF MAJOR ELEMENTS OF THE DRAWINGS

11: panel 11a: galvalume steel plate
11b: polyurethane foam 11c: craft anti-moisture sheet
12: first hot water supply pipe 12a, 13a: polybutene layer
13: second hot water supply pipe 14: first connection part
14a, 15a: cover 15: second connection part
16: connection part 20: boiler
21: hot water supply fitting member 22: hot water retrieval fitting member Modes for Carrying Out the Invention The preferred embodiments of the present invention will be described with reference to the accompanying drawings. Throughout the descriptions of the present invention, the descriptions of the related constructions or the detailed descriptions on the functions will be omitted when they seem to make the subject matters of the present invention unclear.

Figure 3:
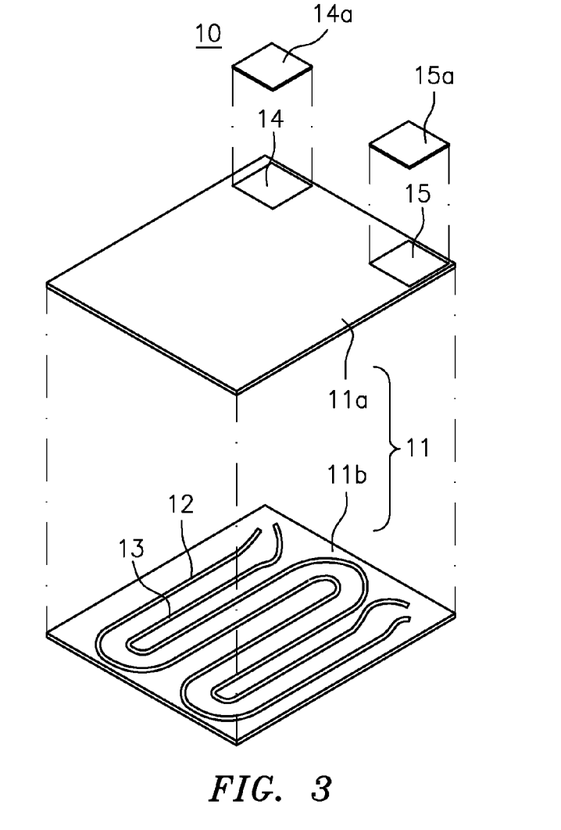
FIG. 3 is a disassembled perspective view illustrating a prefabricated heat-insulation panel with two hot water flow paths according to a first embodiment of the present invention.
Figure 4:
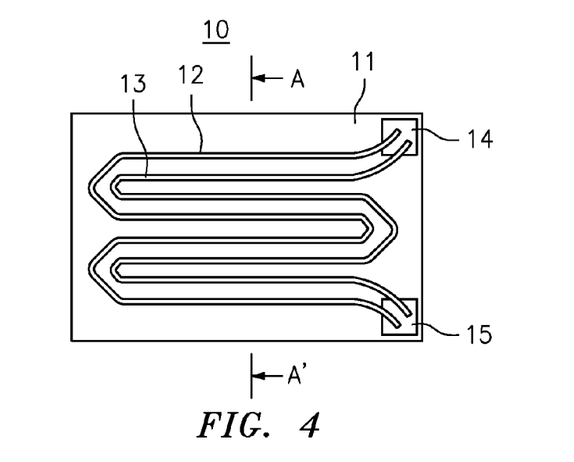
FIG. 4 is a plane view illustrating a prefabricated heat-insulation panel with two hot water flow paths according to a first embodiment of the present invention.

FIG. 3 is a disassembled perspective view illustrating a prefabricated heat-insulation panel with two hot water flow paths according to a first embodiment of the present invention, and FIG. 4 is a plane view illustrating a prefabricated heat-insulation panel with two hot water flow paths according to a first embodiment of the present invention. As shown therein, the prefabricated heat-insulation panel 10 with two hot water flow paths according to the present invention comprises a plurality of panels 11, first and second hot water supply pipes 12 and 13 formed at each panel for allowing two flow paths to be formed for the flows of hot water from boiler 20 (FIG. 12, FIG. 14 and FIG. 15), first and second connection parts 14 and 15 provided at each boiler for allowing the second hot water supply pipes 13 to be connected with each other and then to be connected with each boiler 20 (Figures, 12, 14 and 15), a plurality of connection members 16 (FIGS. 6, 8, 12, 14 and 15) for connecting the first hot water supply pipes 12 and connecting the second hot water supply pipes 13, a hot water supply fitting member 21 (FIGS. 6, 7, 12, 14 and 15) for connecting both ends of the first and second hot water supply pipes 12 and 13 to the boiler 20, respectively, for thereby forming different hot water circulation paths, with the first and second hot water supply pipes 12 and 13 being connected by the connection member 16, and a hot water retrieval fitting member 22 (FIGS. 6, 7,12, 14 and 15).

Figure 5:
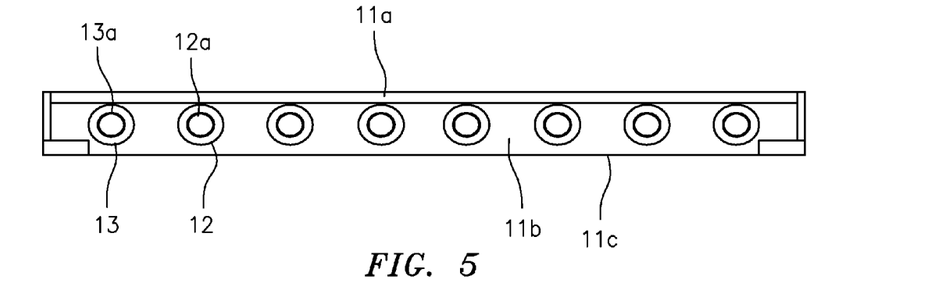
FIG. 5 is a cross sectional view taken along line A-A' of FIG. 4.

The panel 11 is arranged at an installation surface in multiple numbers and provides a surface for heating and might be formed in various forms for accommodating the first and second hot water supply pipes 12 and 13. Preferably, as shown in FIG. 5, the side portion and the upper portion of the same are made of Galvalume steel plate 11a, and the first and second hot water supply pipes 12 and 13 are installed at the Galvalume steel plate 11a at regular intervals along with the polyurethane foam 11b, and a craft anti-moisture sheet 11c is installed at a lower surface of the polyurethane foam 11b.

The first and second hot water supply pipes 12 and 13 are installed at an inner side of the panel 11 for thereby providing different hot water flow paths. The panel 11 has a pair or a plurality of hot water flow paths, each of which might operate for both a pipe for hot water supply and a pipe for retrieval. The first and second hot water supply pipes 12 and 13 are arranged in zigzag shapes for uniformly heating over the entire portions of the panel 11.

The first and second hot water supply pipes 12 and 13 are made of rubber material thermoplastic elastomer (TPV) and have polybutene layers 12a and 13a formed by using rosin at an inner surface via an extrusion molding machine, so they have excellent heat resistance performance and excellent weather resistance performance while well withstanding high temperature hot water and preventing rust and scale. The heat transfer is excellent, and energy saving and faster heating can be obtained, and the pipe arranging intervals and structure are free along with excellent flexibility.

It is preferred that the thicknesses of the first and second hot water supply pipes 12 and 13 are 2~4 mm, more preferably 3 mm, and the thicknesses of the polybutene layers 12a and 13a are 0.3~0.7 mm, more preferably 0.5 mm.

Figure 6:
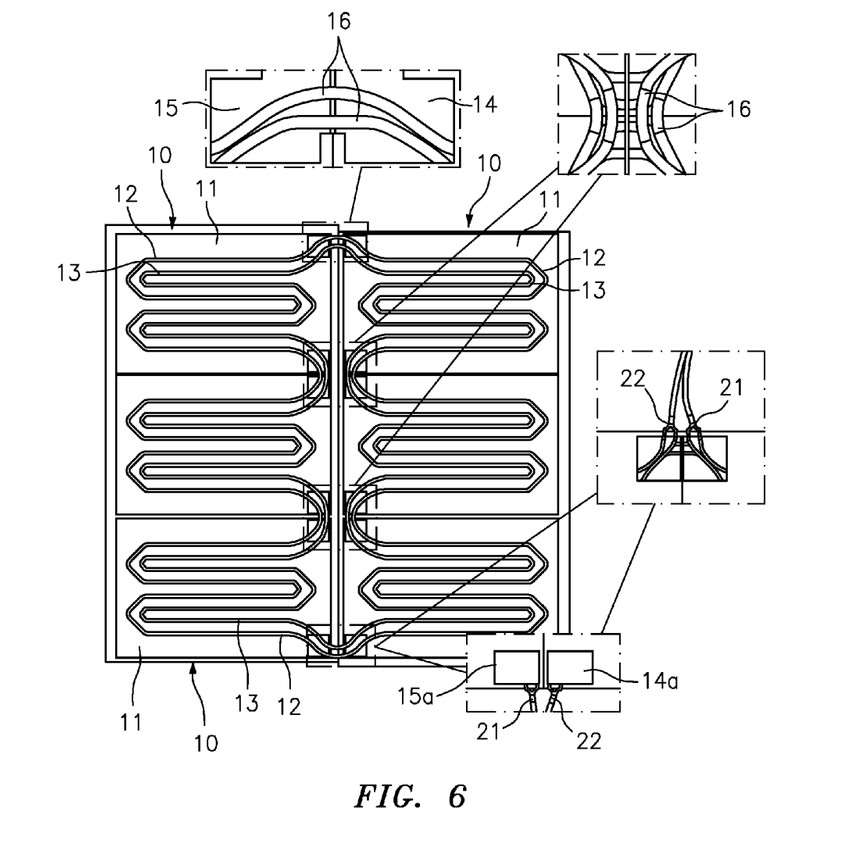
FIG. 6 is a plane view illustrating a state of use of a prefabricated heat-insulation panel with two hot water flow paths according to a first embodiment of the present invention.
Figure 7A:
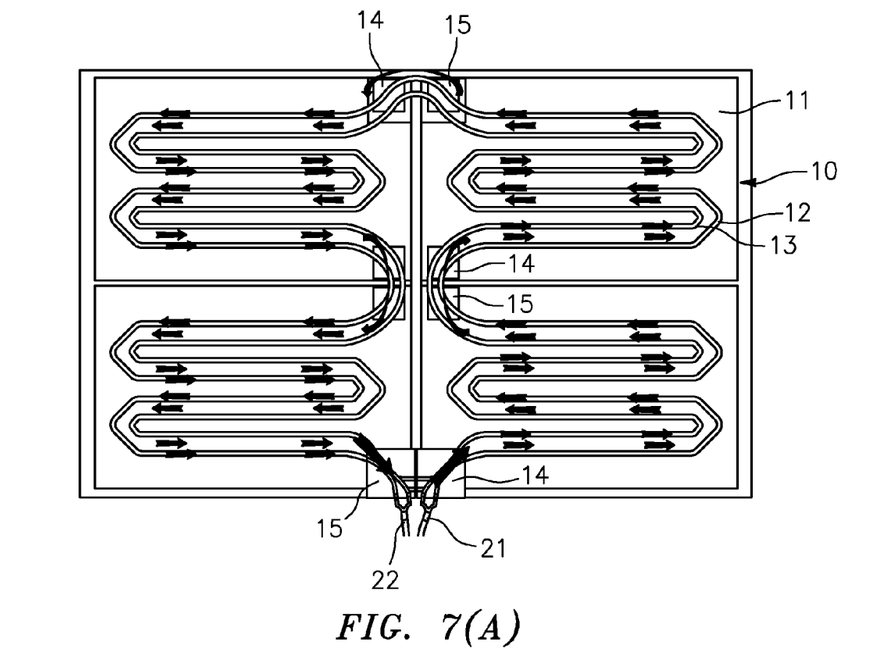
FIG. 7 is a plane view illustrating a hot water flow of a prefabricated heat-insulation panel with two hot water flow paths according to a first embodiment of the present invention.
Figure 7B:
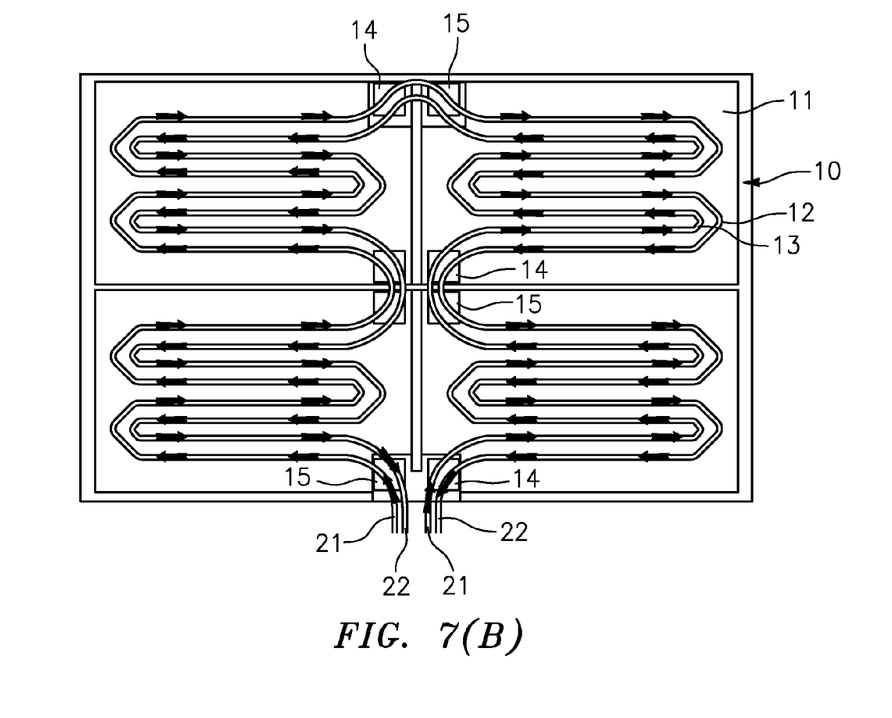
Figure 8:
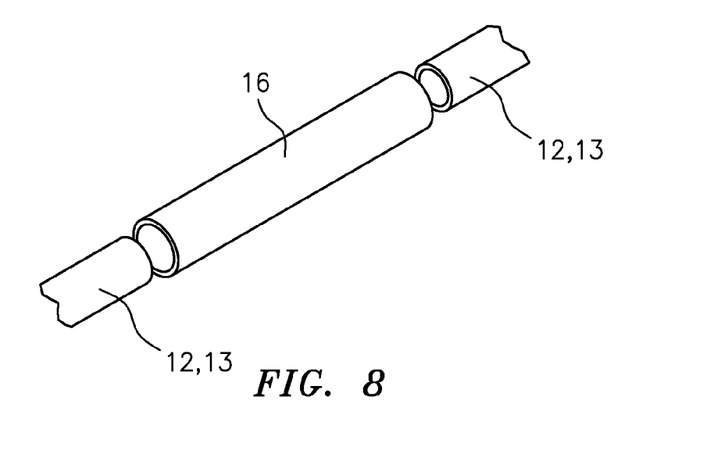
FIG. 8 is a perspective view illustrating a connection member of a prefabricated heat-insulation panel with two hot water flow paths according to a first embodiment of the present invention.
Figure 9:
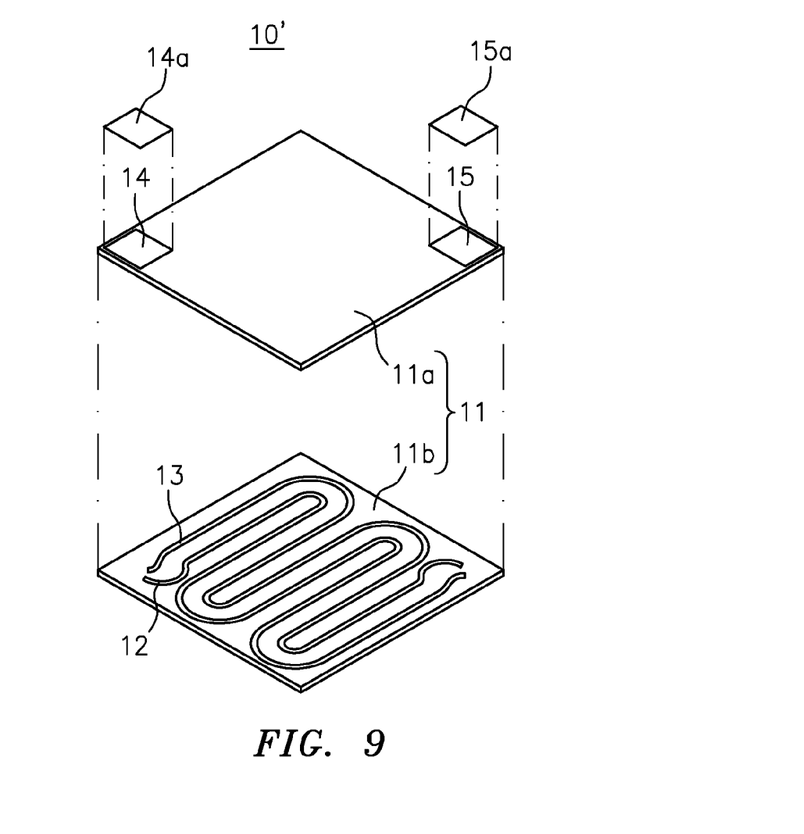
FIG. 9 is a disassembled perspective view illustrating a prefabricated heat-insulation panel with two hot water flow paths according to a second embodiment of the present invention.
Figure 10:
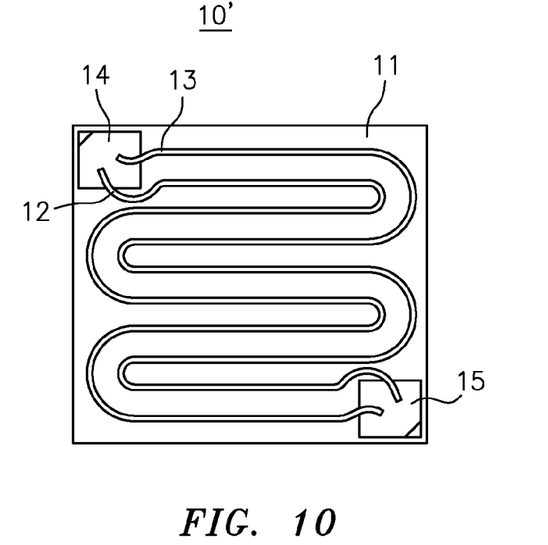
FIG. 10 is a plane view illustrating a prefabricated heat-insulation panel with two hot water flow paths according to a second embodiment of the present invention.
Figure 11:
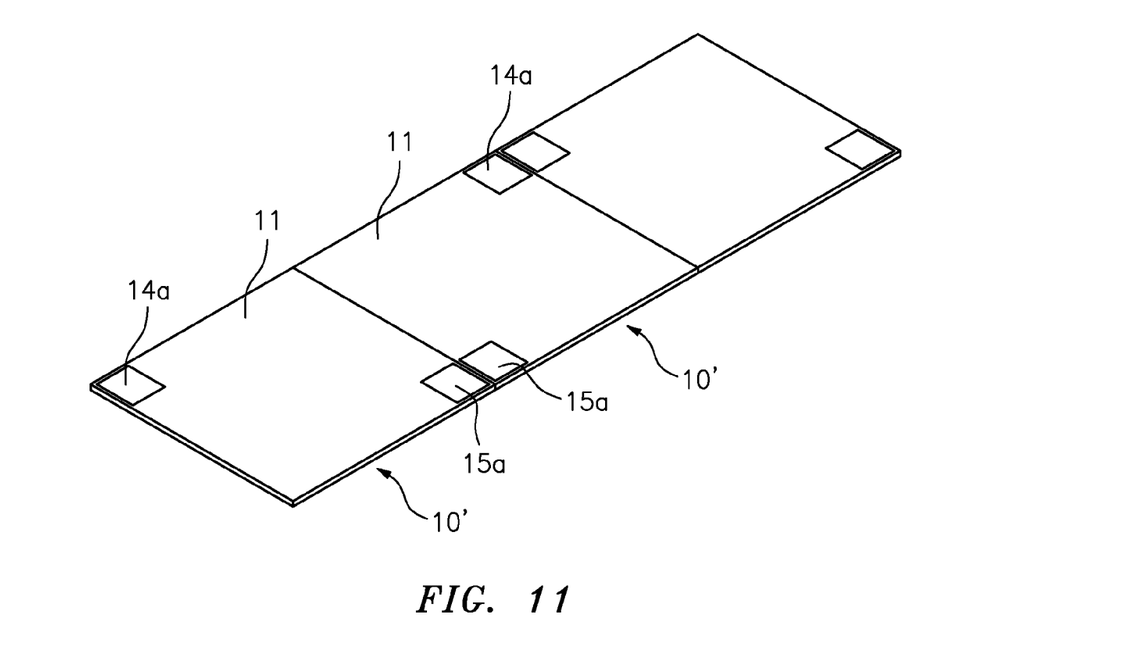
FIG. 11 is a perspective view illustrating a state of another use of a prefabricated heat-insulation panel with two hot water flow paths according to a second embodiment of the present invention.
Figure 12:
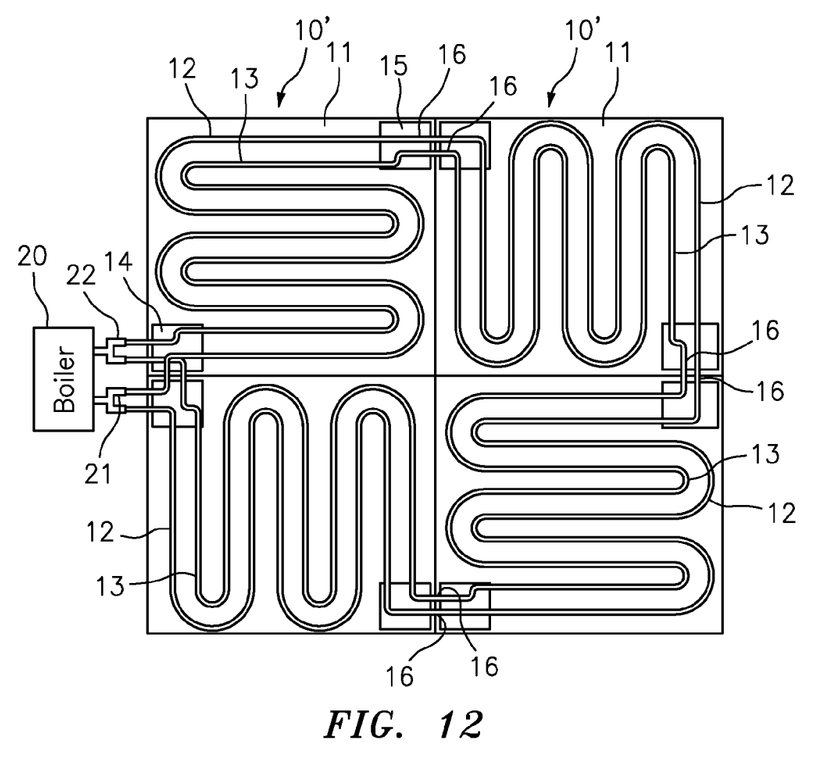
FIG. 12 is a plane view illustrating a state of another use of a prefabricated heat-insulation panel with two hot water flow paths according to a second embodiment of the present invention.

As shown in FIGS. 6 and 7, the first and second hot water supply pipes 12 and 13 are connected with the boiler 20 (FIGS. 12, 14 and 15) by means of the first and second connection parts 14 and 15 or the first and second hot water supply pipes 12 and 13 installed in another panel 11, so that hot water from the boiler 20 circulates and returns to the boiler 20. At least two hot water flow paths are formed by means of the first and second hot water supply pipes 12 and 13, respectively.

The first and second connection parts 14 and 15 are provided at the panel 11 for connecting both ends of the first and second hot water supply pipes 12 and 13 to the boiler 20 (FIGS. 12, 14 and 15) or the first and second hot water supply pipes 12 and 13 installed in another panel 11. Namely, both ends of the first and second hot water supply pipes 12 and 13 are connected to the boiler 20 by means of the first and second connection parts 14 and 15 or the first and second hot water supply pipes 12 and 13 installed in another panel 11. At this time, the first hot water supply pipes 12 are connected with each other by using the connection member 16 of FIG. 6 or FIG. 8, and the second hot water supply pipes 13 are connected.

The first and second connection parts 14 and 15 are formed in a structure having an opening, an open groove or the something so as to expose the ends of the first and second hot water supply pipes 12 and 13 from the panel 11 to the outside and are opened and closed by means of the covers 14a and 15a detachably fixed at the panel 11. The covers 14a and 15a are detachable by integrally assembling the fixture (not shown) formed at the inner side to the engaging groove (not shown) formed in the interior of the panel 11.

The first and second hot water supply pipes 12 and 13 have different hot water flow paths from each other, so both ends of the first hot water supply pipe 12 connected for forming at least two hot water flow paths for heating in the interior of the panel and both ends of the second hot water supply pipe 13 are connected with the boiler 20 (FIGS. 12, 14 and 15) by means of the hot water supply fixing member 21 and the hot water retrieval fitting member 22. In addition, both ends of the hot water supply fitting member 21 are divided for a connection with the first and second hot water supply pipes 12 and 13 like the hot water retrieval fitting member 22.

As shown in A of FIG. 7, the first and second hot water supply pipes 12 and 13 are connected with the boiler 20 (FIGS. 12, 14 and 15) so that uniform hot water flow is made between the first and second connection parts 14 and 15. As shown in B of FIG. 7, they might be connected with the boiler 20 so that the flow directions between the first and second connection parts 14 and 15 are opposite to each other.

As shown in B of FIG. 7, in case that hot water is supplied to the second hot water supply pipe 13 via the first connection part 14, the hot water is retrieved from the first hot water supply pipe 12 via the first connection part 14, and on the contrary in case that the hot water is supplied from the first hot water supply pipe 12 via the first connection part 14, the hot water is retrieved from the second hot water supply pipe 13 via the first connection part 14. The above supply and retrieval of hot water might be applied to the second connection. Since the flows of the hot water via the first and second hot water supply pipes 12 and 13 have opposite directions, heating can be faster and uniformly performed.

The first and second connection parts 14 and 15 might be formed at a corner neighbored by each other or at one side of the panel 11 together or at each side like the present embodiment. Like the prefabricated heat-insulation panel with two hot water flow paths 10' according to a second embodiment of FIGS. 9 to 12, the first and second connection parts 14 and 15 might be provided in a diagonal direction of the panel 10' for an easier connection of the first and second hot water supply pipes 12 and 13 provided at the panel 10'.

Figure 13:
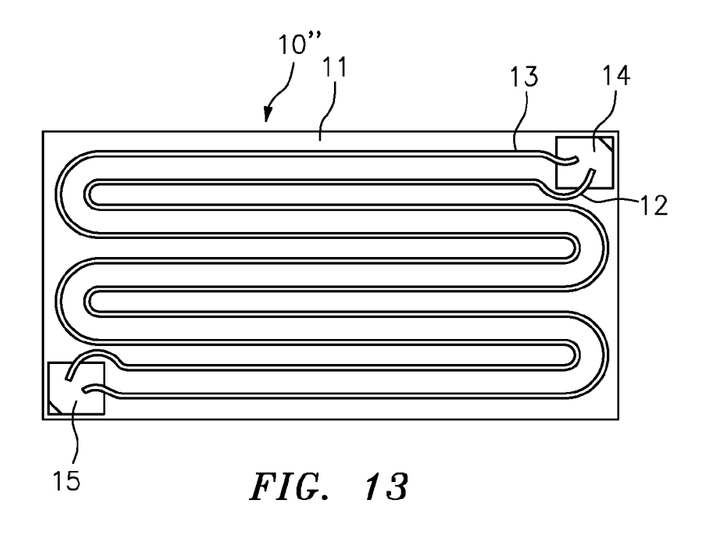
FIG. 13 is a plane view illustrating a prefabricated heat-insulation panel with two hot water flow paths according to a third embodiment of the present invention.
Figure 14:
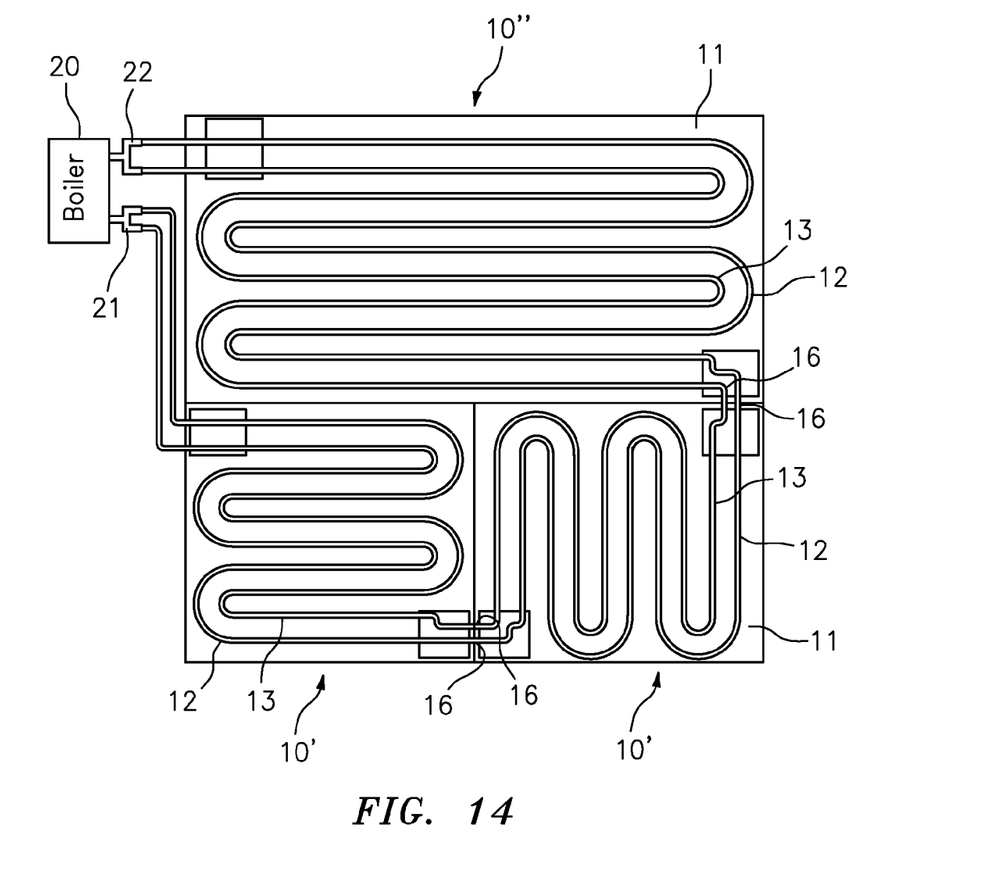
FIG. 14 is a plane view illustrating a state of use of a prefabricated heat-insulation panel with two hot water flow paths according to a third embodiment of the present invention.

The panel 11 might be formed in a rectangular shape like the prefabricated heat-insulation panel 10 with two hot water flow paths according to the first embodiment and like the prefabricated heat-insulation panel 10 with two hot water flow paths according to the third embodiment of FIG. 13 and might be formed in a square shape like the prefabricated heat-insulation panel 10' with two hot water flow paths according to the second embodiment. The above disclosed construction is not limited thereto. Various shapes might be provided including a polygonal shape so as to provide an area enough for heating in the course of assembling. As shown in FIG. 14, the prefabricated heat-insulation panels 10' and 10" having different shapes might be formed.

The operation of the prefabricated heat-insulation panel with two hot water flow paths according to the present invention will be described.

As shown in FIGS. 6 and 7 and 11 and 12, the prefabricated heat-insulation panels 10 and 10' of the same shapes might be arranged or as shown in FIG. 14, the panels 10' and 10" of different shapes might be arranged, and then the first hot water supply pipes 12 or the second hot water supply pipes 13 are connected to the boiler 20 by using the fitting members 21 and 22 and the connection member 16 via the first and second connection parts 14 and 15 for thereby providing different hot water flow paths in pairs. The hot water which is supplied from the boiler 20 and circulates flows along the first hot water supply pipe 12 and flows along the second hot water supply pipe 13 for thereby enhancing heating efficiency. Hot water circulating along different flow paths exchange heat with each other, which prevents cooling while enhancing heat efficiency.

Figure 15A:
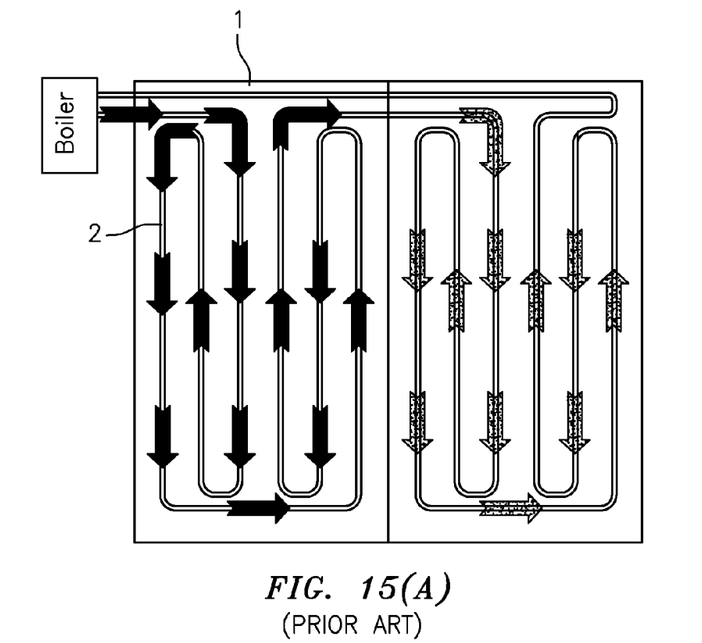
FIG. 15 is a plane view for comparing the operation between a prefabricated heat-insulation panel with two hot water flow paths according to the present invention and a conventional heat-insulation panel.
Figure 15B:
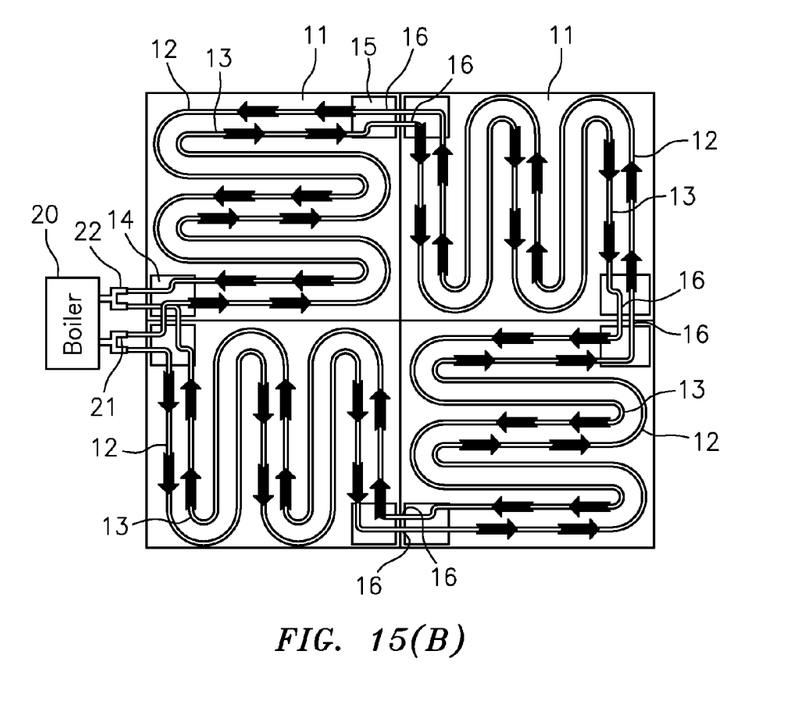

As shown in A of FIG. 15, the temperature difference between the hot water supply side and the hot water retrieval side is large since hot water is supplied via a singular hot water supply pipe in case of a conventional heat-insulation panel, whereas as shown in B of FIG. 15, in case of prefabricated heat-insulation panel with two hot water flow paths according to the present invention, since the hot water flow paths are provided in at least one pair, the faster and uniform heating can be performed when supplying hot water by using the boiler 20.

The conventional heat-insulation panel needs a longer hot water supply pipe due to one line heating system in which hot water is supplied in one direction of the hot water supply pipe at a start portion of the hot water supply pipe. Since a lot of water is filled in the hot water supply pipe, namely, an excel hose, it takes a long time to heat, and energy efficiency is low. In the conventional art, water returns after heating, and then the water heated by the boiler flows again. In this case, the start portion is hot, but the temperature of the hot water supply pipe returning to the boiler is relatively lower. In this case, enough time is needed until the cooled water returns to the boiler. In order to overcome the above problems, the present invention which adapts a pair of hot water supply pipes 12 and 13 based on a double discharge system is characterized in that the amount of water in the hot water supply pipes 12 and 13 is relatively small, and the start flows of hot water are uniform in both left and right sides, which leads to a faster heating operation, and the entire heating is possible. With the aid of a pair of hot water circulations, heat efficiency is excellent when heating a certain area as compared to the conventional single path of hot water heating, and energy can be saved.

Since the pipe arrangements are dense and the heating efficiency increases as compared to the conventional heat-insulation panel having a single pipe structure, the diameters and lengths of the first and second hot water supply pipes 12 and 13 formed at the panel 11 can be reduced, while reducing the thickness of the panel 11, so it is possible to minimize the load applied to the boiler 20, and the flow speed of the hot water circulating along the first and second hot water supply pipes 12 and 13 increases, which results in a faster heating.

In case of the hot water panel having a single pipe structure, when a hot water supply pipe having an inner diameter of 12 mm per sheet and a length of 10 m is used, the amount of hot water ($3.14 \times 0.6 \times 0.6 \times 1,000$) in the hot water supply pipe can be computed. As a result of the computation, about 1.12 ml of water is used, whereas the prefabricated heat-insulation panel 10 according to the present invention is characterized in that when the first and second hot water supply pipes 12 and 13 each having an inner diameter of 7.5 mm and a length of 6.5 m are used in order to heat the same area as in the conventional heat-insulation panel, when computing the amount of hot water ($3.14 \times 0.375 \times 0.375 \times 650 \times 2$) in the first and second hot water supply pipes 12 and 13, about 0.57 ml of hot water is used. The prefabricated heat-insulation panel according to the present invention uses much less amount of water per the unit area when using two sheets of heat-insulation panels per the unit area is used, as compared to the conventional heat-insulation panel, which means that almost two times heating efficiency can be obtained when using the boiler having the same capacity.

The first and second hot water supply pipes 12 and 13 are formed by using elastomer of thermoplastic, and polybutene layers 12a and 13a with rosin as an activator are formed on the inner surface, so it is possible to form a double arrangement structure of the hot water supply pipes having excellent heat resistance and weather resistance performances, and the arranging intervals of the first and second hot water supply pipes 12 and 13 are free to select, and the dense arrangement of the first and second hot water supply pipes 12 and 13 can be easily increased, which leads to enhancing the heating efficiency.

When arranging the prefabricated heat-insulation panels 10, 10' and 10" each having two hot water flow paths 12 and 13 according to the present invention, the connections of the first and second hot water supply pipes are easy, and the construction performance is excellent.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. Prefabricated heat-insulation panels with two hot water flow paths, comprising:
    a plurality of panels arranged at an installation surface;
    first and second hot water supply pipes installed to provide at least one pair of hot water flow paths at an inner side of each said panel, with hot water being supplied from a boiler;
    first and second connection parts provided at a corner at each said panel for connecting the first hot water supply pipes of adjacent panels with each other and for connecting the second hot water supply pipes of adjacent panels with each other, the connected first hot water supply pipes and the connected second hot water supply pipes being connected to the boiler, respectively;
    a plurality of connection members arranged at said respective first and second connection parts for interconnecting the respective first hot water supply pipes of the adjacent panels with one another and interconnecting the respective second hot water pipes of the adjacent panels with one another; and
    a hot water supply fitting member and a hot water retrieval fitting member which each connect respective ends of each of the first and second hot water supply pipes to the boiler, for thereby forming different hot water flow paths, wherein
    said supply fitting and retrieval fitting members each have a Y-shaped configuration arranged in a plane of fluid flow through the respective pipes to both channel and divide hot water flow from the boiler between the first and second hot water pipes and combine flow exiting from the first and second hot water pipes and channel the same back to the boiler at respective connection parts located at corners of respective panels,
    said first and second hot water supply pipes are made of thermoplastic elastomer of rubber material and each have a polybutene layer with a rosin as an activator on an inner surface thereof,
    said panels each comprise
    a metal plate on a upper side thereof,
    a polyurethane foam on one side of the metal plate and in which the first and second hot water pipes are embedded directly at the metal plate at regular intervals, and
    an anti-moisture sheet on a lower side of the polyurethane foam opposite the metal plate and spaced from the pipes.

2. Prefabricated heat-insulation panels with two hot water flow paths according to claim 1, wherein said first and second hot water supply pipes each have a thickness of 2~4 mm, and the thickness of the polybutene layer is 0.3~0.7 mm.

3. Prefabricated heat-insulation panels with two hot water flow paths according to claim 2, wherein said first and second hot water supply pipes each have a thickness of about 3 mm, and the thickness of the polybutene layer is about 0.5 mm.

4. Prefabricated heat-insulation panels with two hot water flow paths according to claim 1, wherein said first and second hot water supply pipes are arranged in parallel in a zigzag form in the interior of the panel.

5. Prefabricated heat-insulation panels with two hot water flow paths according to claim 1, wherein said first and second hot water supply pipes are connected such that the hot water flow directions between the first and second connection parts are different from each other.

6. Prefabricated heat-insulation panels with two hot water flow paths according to claim 1, wherein said first and second connection parts are disposed at diagonal corners of each said panel.

7. Prefabricated heat-insulation panels with two hot water flow paths according to claim 1, additionally comprising covers arranged for detachably covering said first and second connection parts and being detachably fixable to a respective panel.

8. Prefabricated heat-insulation panels with two hot water flow paths according to claim 1, wherein the metal plate is made of Galvalume steel.

9. Prefabricated heat-insulation panels with two hot water flow paths according to claim 1, wherein the metal plate also covers side portions of the polyurethane foam extending between the opposite sides thereof on which the anti-moisture sheet and the metal plate are located.

10. Prefabricated heat-insulation panels with two hot water flow paths according to claim 9, wherein said connection parts are each formed with an opening or open groove through said metal plate extending along the side portions of the polyurethane foam, to expose ends of the first and second hot water supply pipes from a respective panel to the outside.

11. Prefabricated heat-insulation panels with two hot water flow paths according to claim 1, wherein the first and second hot water pipes are separately embedded to be spaced from one another within the polyurethane foam extending therebetween.

12. Prefabricated heat-insulation panels with two hot water flow paths according to claim 1, wherein said connection parts are each formed with an opening or open groove to expose ends of the first and second hot water supply pipes from a respective panel to the outside.

13. Prefabricated heat-insulation panels with two hot water flow paths according to claim 12, additionally comprising covers arranged for detachably covering said openings or open grooves of said first and second connection parts and being detachably fixable to the respective panel.

14. Prefabricated heat-insulation panels with two hot water flow paths according to claim 1, wherein said first and second hot water supply pipes are connected such that the hot water flow directions between the first and second connection parts are the same.

15. Prefabricated heat-insulation panels with two hot water flow paths according to claim 1, wherein said first and second connection parts are disposed at opposite corners of a side of each said panel.

16. Prefabricated heat-insulation panels with two hot water flow paths according to claim 1, wherein at least two of said panels are of different size and/or shape from one another.

17. Prefabricated heat-insulation panels with two hot water flow paths according to claim 1, wherein said supply fitting and retrieval fitting members each have the Y-shaped configuration arranged to immediately channel hot water flow from the boiler to hot water pipes of adjacent panels and receive flow exiting hot water pipes of adjacent panels and channel the same back to the boiler.

\* \* \* \* \*